(12) United States Patent
Yang et al.

(10) Patent No.: US 7,665,007 B2
(45) Date of Patent: Feb. 16, 2010

(54) RETRIAL AND REREAD METHODS AND APPARATUS FOR RECORDING CHANNELS

(75) Inventors: Xueshi Yang, Pittsburgh, PA (US); Erozan Kurtas, Pittsburgh, PA (US)

(73) Assignee: Seagate Technology, LLC, Scotts Valley, CA (US)

( * ) Notice: Subject to any disclaimer, the term of this patent is extended or adjusted under 35 U.S.C. 154(b) by 703 days.

(21) Appl. No.: 10/881,398

(22) Filed: Jun. 30, 2004

(65) Prior Publication Data

US 2006/0002689 A1    Jan. 5, 2006

(51) Int. Cl.
*H03M 13/00* (2006.01)
(52) U.S. Cl. .................... 714/755; 714/55; 714/814
(58) Field of Classification Search .......... 714/755, 714/55, 814
See application file for complete search history.

(56) References Cited

U.S. PATENT DOCUMENTS

| | | | | |
|---|---|---|---|---|
| 5,283,791 | A * | 2/1994 | Halford | 714/766 |
| 6,009,549 | A * | 12/1999 | Bliss et al. | 714/769 |
| 6,389,573 | B1 | 5/2002 | Weng | 714/784 |
| 6,405,342 | B1 | 6/2002 | Lee | 714/792 |
| 6,823,487 | B1 * | 11/2004 | Poeppelman | 714/785 |
| 2004/0225949 | A1 * | 11/2004 | Coombs et al. | 714/796 |

OTHER PUBLICATIONS

Patapoutian, A. and Vea, M. "Improving Re-read Strategies by Waveform Averaging," IEEE Transactions on Magnetics, vol. 37, No. 6, Nov. 2001. pp. 3969-3976.

Patapoutian, A. and Vea, M. "The Effect of a Reread on Data Reliability," iEEE Transactions on Magnetics, vol. 33, No. 5, Sep. 1997, pp. 2710-2712.

Bergmans, J. "Efficiency of Data-Aided Timing Recovery Techniques," IEEE Transactions on Information Theory, vol. 41, No. 5, Sep. 1995 pp. 1397-1408.

Agazzi, O. and Seshadri, N. On the Use of Tentative Decisions to Cancel Intersymbol Interference and Nonlinear Distortion (With Application to Magnetic Recording Channels) IEEE Transactions on Information Theory, vol. 43, No. 2, Mar. 1997 pp. 394-408.

Agazzum O. and Seshadri, N. When Can Tentative Decisions be Used to Cancel (Linear or Nonlinear) Intersymbol Interference? (With Application to Magnetic Recording Channels), IEEE 1995, pp. 647-652.

(Continued)

*Primary Examiner*—M. Mujtaba K Chaudry
*Assistant Examiner*—Enam Ahmed
(74) *Attorney, Agent, or Firm*—Westerman, Champlin & Kelly, P.A.

(57) ABSTRACT

A method of reading a data block from a sector of a recording media is described. The data block from the sector of the recording channel is decoded with an ECC decoder (first trial). The data block is re-decoded (second trial) using an adjusted timing recovery block that is adjusted based on the decoded data block, if the number of errors exceeded an error correction capability of the ECC decoder on the first trial. In one embodiment, the data block is reread from the same sector of the recording channel using the adjusted timing recovery block that is adjusted based on the re-decoded data block. The data block is subsequently jointly decoded with the waveforms obtained from the second trial by a possibly modified sequence detector, if the number of errors exceeded the error correction capability of the ECC decoder during the second trial.

27 Claims, 12 Drawing Sheets

OTHER PUBLICATIONS

Bergmans, J. "A Bit-By-Bit detector for partial-response reception on digital magnetic recording channels," Phillips Research Laboratories 1994, pp. 1148-1151.

Bergmans, J. and Wong-Lam, H. "A Class of Data-Aided Timing Recovery Schemes," IEEE Transactions on Communications, vol. 43, No. 2-4 Feb.-Apr. 1995, pp. 1819-1827.

Hagenauer, J. and Hoeher, P. "A Viterbi Algorithm with Soft-Decision Outputs and its Applications," German Aerospace Research Establishment Institute for Communications Technology. IEEE 1989. pp. 1680-1686.

L.R. Bahl et al. "Optimal Decoding of Linear Codes for Minimizing Symbol Error Rate," IEEE Transactions on Information Theory, Mar. 1974. pp. 284-287.

D. Costello, Jr. et al. "Applications of Error-Control Coding," IEEE Transactions on Information Theory, vol. 44, No. 6, Oct. 1998, pp. 2531-2560.

Patapoutian, A. "Analog-to-Digital Converter Algorithm for Position Error Signal Estimators" IEEE Transactions on Magnetics, vol. 36, No. 1, Jan. 2000. pp. 395-400.

S. Brink et al. "Two-Dimensional Iterative APP Channel Estimation and Decoding of OFDM Systems," IEEE 2000, pp. 741-745.

A. Patapoutian et al. "Event Error Control Codes and Their Applications," IEEE Transactions on Information Theory, vol. 47, No. 6, Sep. 2001, pp. 2595-2603.

A. Deshpande. "Better Lower Bounds for Locally Decodable Codes," IEEE Annual Conference on Computational Complexity. 2002. pp. 1-10.

\* cited by examiner

RETRIAL AND REREAD METHODS AND APPARATUS FOR RECORDING CHANNELS

CROSS-REFERENCE TO RELATED APPLICATION

None.

FIELD OF THE INVENTION

The present invention relates to systems and methods for performing retrial operations for recording channels, and more particularly, to a system and method for reducing a frequency of re-read operations to improve overall system performance.

BACKGROUND OF THE INVENTION

Storage systems typically employ a number of different techniques for minimizing errors in reading from a storage media. For example, redundant symbols of an error control code are appended after each data block recorded on the storage media. The redundant symbols can be utilized to detect data block errors when the storage system attempts to read a data block. A block read fails when the number of symbol errors exceeds the capability of an error correcting code (ECC). Conventionally, when a read failure is detected by the error control code, the storage system reads the block of data a second time. Unfortunately, reread operations increase system latency and degrade system throughput, in part, due to the process of repositioning the read head and to the associated rereading of the data block.

Due to the overhead associated with reread operations, techniques have been developed to exploit the reread signals more efficiently than simply independently decoding the reread signals. One technique for exploiting the reread signals more efficiently may be referred to as a waveform averaging retrial, which is described in an article entitled "Improving Re-read Strategies by Waveform Averaging" by A. Patapoutian et al., IEEE Transactions on Magnetics, Vol. 37, No. 6, November, 2001, pp. 3969-3976, and which is incorporated herein by reference in its entirety. The waveform averaging retrial technique involves averaging the reread signal with samples obtained from the first read attempt and decoding the averaged samples. The averaging process reduces non-repeatable noise, thereby increasing the signal-to-noise ratio.

Another technique for exploiting the reread signals more efficiently may be referred to as an erasure ECC retrial, which is described in U.S. Pat. No. 6,389,573, entitled "Enhanced Read Retrial Scheme" and which is incorporated herein by reference in its entirety. The erasure ECC retrial generally compares the decoded results of the first read and the reread of the data to identify symbols locations for which corresponding symbols are of unequal value. At least one of the codeword copies is decoded by an error-erasure decoding operation using the identified symbol locations as erasures. By converting the errors to erasures, the ECC decoder can tolerate up to twice as many symbol errors than would ordinarily be acceptable. Thus, the retrial procedure is enhanced.

A third technique involves ECC aided bias-detection, which is described in U.S. Pat. No. 6,405,342 entitled "Disk Drive Employing a Multiple-Input Sequence Detector Responsive to Reliability Metrics to Improve a Retry Operation" and which is incorporated herein by reference in its entirety. ECC aided bias-detection utilizes correctly decoded bits from the first read operation to bias or "guide" the sequence detection for the reread signal.

In general, there is an on-going need for improvements in the bit error rate (BER) at realistic signal-to-noise ratios without adversely impacting performance criteria, such as capacity, throughput, latency and the like. Embodiments of the present invention provide solutions to these and other problems, and offer other advantages over the prior art.

SUMMARY OF THE INVENTION

A method of reading a data block from a sector of a recording media is described. The data block from the sector of the recording channel is decoded with an ECC decoder (first trial). The data block is re-decoded (second trial) using an adjusted timing recovery block that is adjusted based on the decoded data block, if the number of errors exceeded an error correction capability of the ECC decoder on the first trial. In one embodiment, the data block is reread from the sector of the recording channel using the adjusted timing recovery block that is adjusted based on the redecoded data block and subsequently jointly decoded with the waveforms obtained from the second trial by a possibly modified sequence detector, if the number of errors exceeded the error correction capability of the ECC decoder during the second trial.

A system for decoding data from a recording media includes a recording media, a read circuit, and a decoder circuit. The recording media stores data. The read circuit is coupled to the recording media and is adapted to read data from a sector of the recording media. The decoder circuit is coupled to the read circuit and is adapted to decode data read from the recording media by the read circuit. The read circuitry and the decoder circuit are adapted to perform a second decoding operation using adjusted timing recovery if a number of errors of the read data exceeds an error correction capability of the decoder circuit. In one embodiment, the system is adapted to reread the data from the same sector of the storage media if the second decoding operation fails.

Other features and benefits that characterize embodiments of the present invention will be apparent upon reading the following detailed description and review of the associated drawings.

DETAILED DESCRIPTION OF ILLUSTRATIVE EMBODIMENTS

The present invention exploits the ECC decoding results from the first read operation to revise or to refine the timing recovery based on the readback waveforms from the first read. After refining the timing recovery, a retrial is attempted using the refined timing recovery without invoking a reread operation. In some instances, improvement in the synchronization may result in successful decoding of the data in the retrial. If the sector read fails in the retrial, the storage system may then perform a reread operation.

To improve the efficiency of the reread operation, the reread signal is synchronized under the direction of the decoded results from the previous trial, and subsequently is jointly decoded with the signal samples from the last retrial by using a possibly state-pinned sequence detector. The state-pinning of the sequence detector is determined from correctly decoded codewords (if any) from the last retrial.

The present invention significantly improves system performance by reducing reread frequency and by improving data reliability. By using the decoded data to improve the timing recovery, the present invention achieves improved synchronized signal samples and consequently fewer symbol errors. If the number of symbol errors can be reduced below the error correction capability of the ECC, the sector becomes successful, leading to a reduction in the sector failure rate (SFR). Since the retrial process is performed without a reread operation, reread latency and consequently system throughput degradation associated with the reread operation are minimized.

Additionally, the present invention exploits the reread signal, taking advantage of both copies of the reread signal as well as the decoded results from the first read to improve system performance. Specifically, the reread signal and the decoded results from the first read are utilized with correctly decoded codewords from the first read operation to refine both data detection and synchronization.

Figure 1:
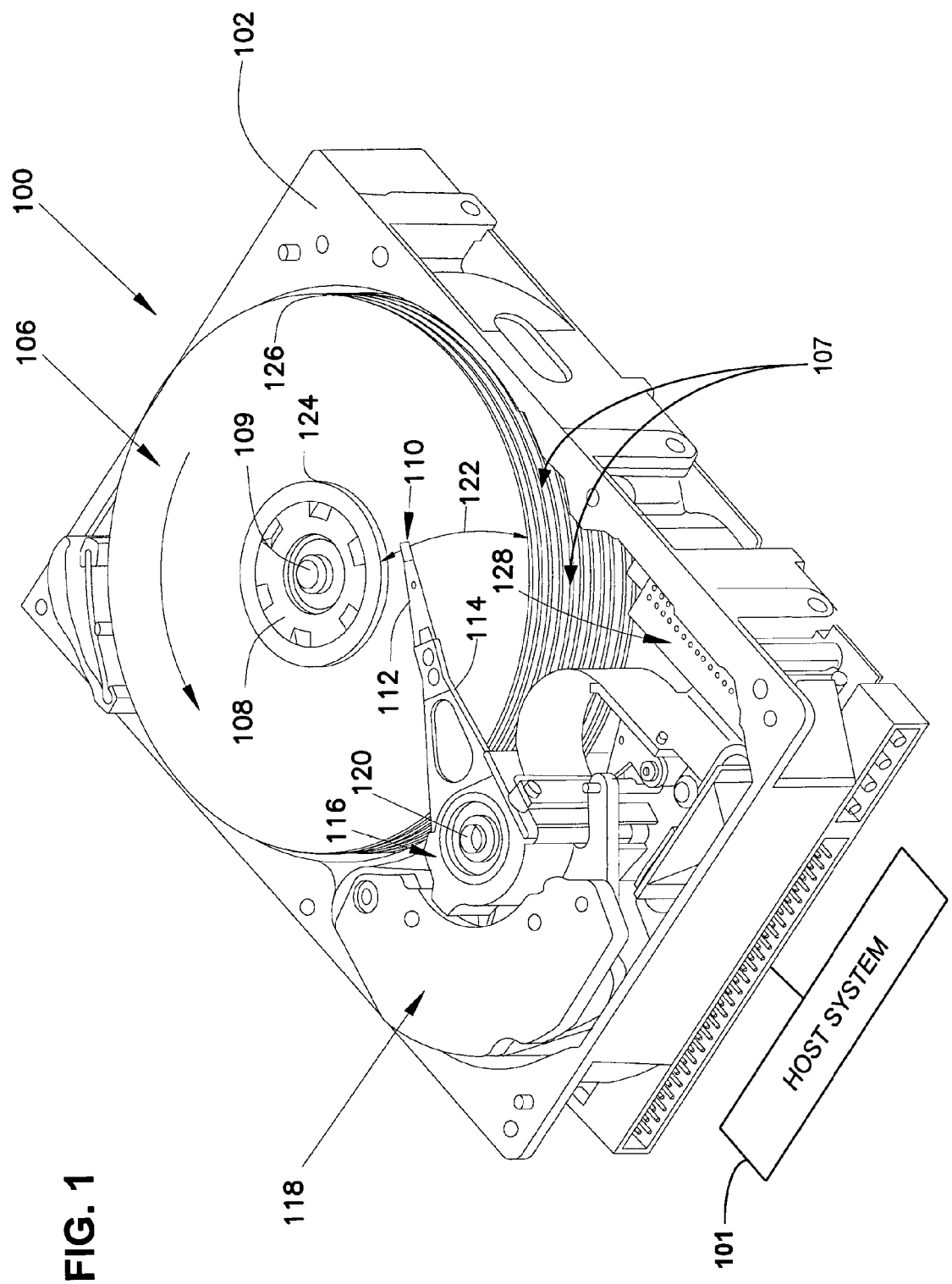
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 128 based on signals generated by heads 110 and a host computer (not shown).

It will be understood by a worker skilled in the art that the present invention is applicable to any type recording channel, including a recording channel of a disc drive system such as that shown in FIG. 1. In alternative embodiment, the recording channel is any path over which interleaved codewords represented as electrical or electromagnetic signals may pass.

Figure 2:
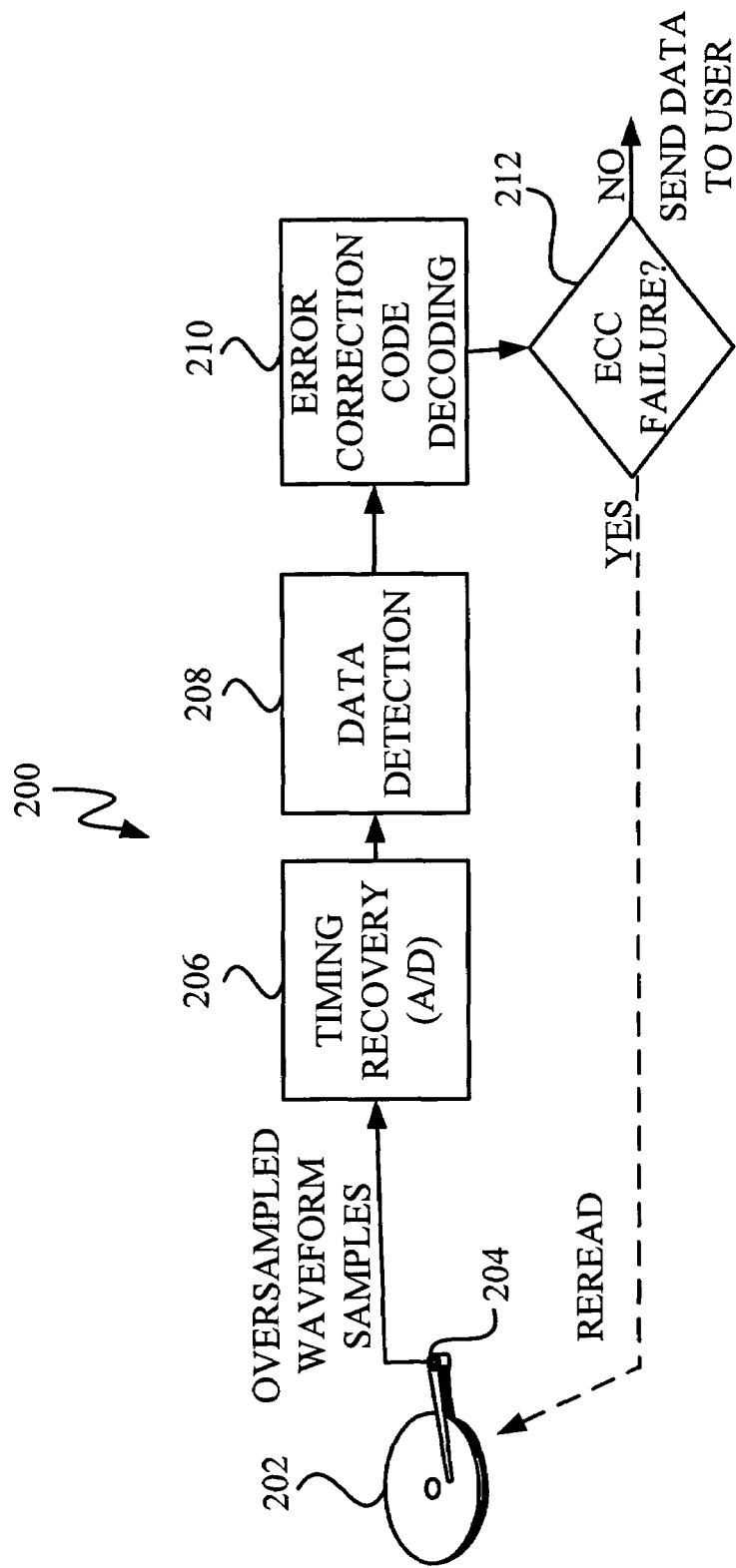
FIG. 2 is a simplified block diagram of a conventional recording channel architecture.

FIG. 2 illustrates a simplified block diagram of a conventional recording channel architecture 200. The conventional architecture 200 includes a storage media 202 with a read mechanism 204, which may be a magnetic read/write head. A timing recovery block 206 is coupled to the read mechanism 204. Data read from the storage media 202 via the read mechanism 204 passes through the timing recovery (A/D) block 206 and is passed to a data detection block 208. The data detection block 208 passes detected data bits to an error correction code decoding block 210. The error correction code decoding block 210 verifies the data bits using error correction codes embedded in the detected data block. If there are no errors or if the error correction code decoding block 210 is able to correct detected errors, the error correction code decoding block 210 succeeds and data is sent to the user or to the user's device.

When there is a block failure, signaled by an ECC decoding failure 212, the system 200 issues a reread command, which causes the storage media 202 to be re-rotated and the read mechanism 204 to be re-positioned to obtain a second copy of a readback signal from the same sector of the storage media 202. The second copy of the readback signal is subsequently processed by the system 200.

This conventional system introduces latencies due to the time required to reposition the read/write mechanism 204 and reorient the disc media 202 to reread the same sector of the storage media 202. Moreover, processing of the reread signal also introduces latencies. Due to the latencies associated with the reread operation, it is generally desirable to minimize the reread frequency.

In general, a detector (detector block 208) according to an embodiment of the present invention is a sequence detector such as a Viterbi detector, a soft-output Viterbi algorithm, or a BCJR algorithm. The detector 208 processes sampled waveforms read from the storage medium and synchronized by the timing recovery block 206 to detect a bit sequence (data block) contained within the sampled waveforms.

The purpose of the timing recovery block 206 is to obtain synchronization. Two quantities must be determined by the block 206 to achieve synchronization. The first is the sampling frequency. Locking the sampling frequency requires estimating the symbol period so that samples can be taken at the correct rate. Although this quantity should be known (for example, the system's symbol rate might be specified to be 20 MHz), oscillator drift will introduce deviations from the stated symbol rate.

The other quantity to determine is sampling phase. Locking the sampling phase involves determining the correct time within a symbol period to take a sample. For example, symbol pulse shapes have a peak in the center of the symbol period, and sampling the symbol at this peak results in the best signal-to-noise-ratio.

In general, it should be understood that the data block is a bit sequence, which is read by sampling a waveform of a channel, such as a track of a recording medium. To decode the bit sequence stored on a storage medium, waveforms are sampled from the recording medium. The sampled waveforms are synchronized according to a timing recovery block. A detector detects the bit sequence (or data block) within the synchronized and sampled waveform. The bit sequence is then decoded with, for example, an ECC decoder.

Figure 3:
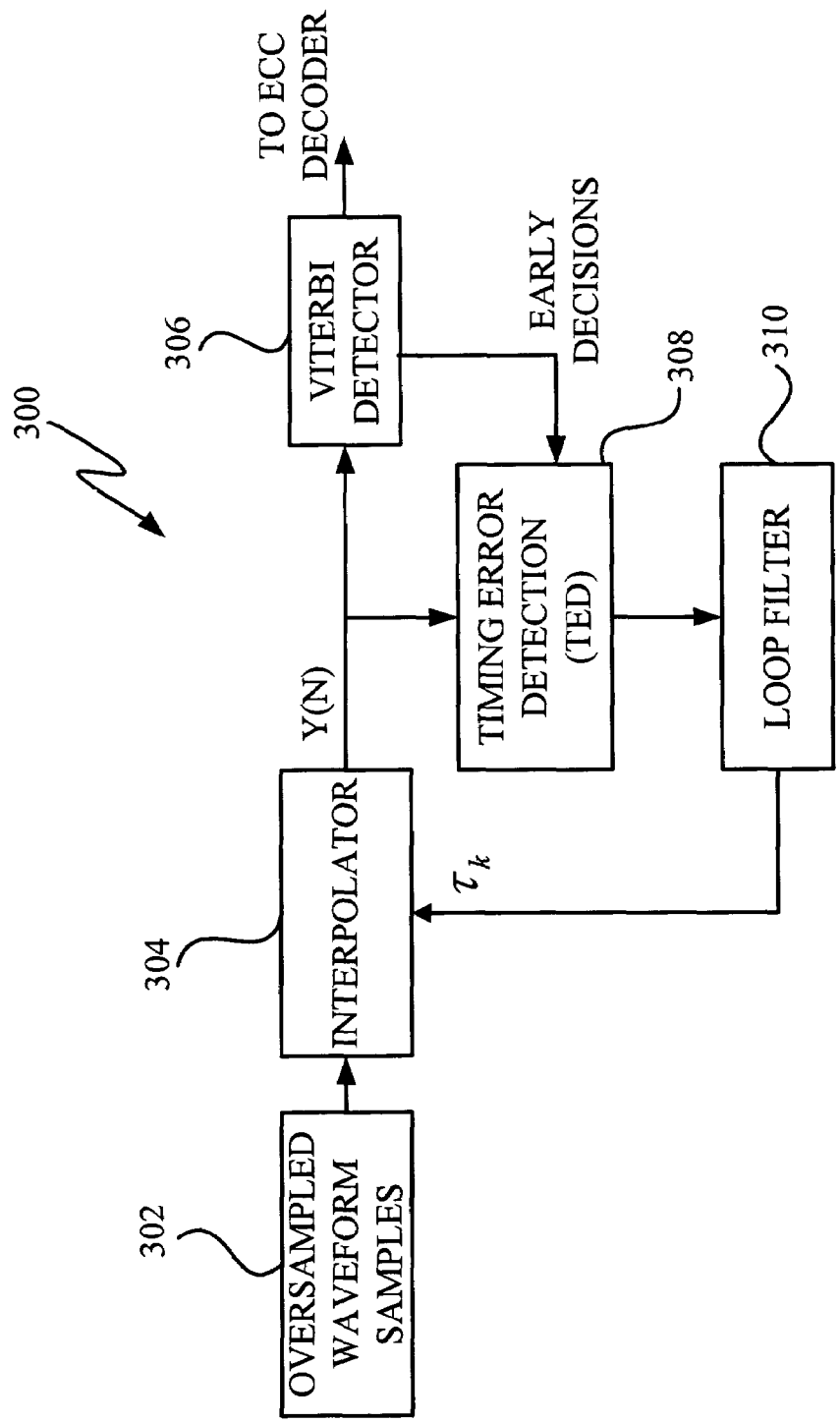
FIG. 3 is a simplified block diagram of a decision-directed timing recovery architecture.

FIG. 3 shows a decision-directed (DD) timing recovery architecture 300. The oversampled waveform samples 302 are provided to an interpolator 304, which processes the oversampled waveform samples 302 to produce a partial response equalized output signal y(n). The output signal y(n) is passed to a Viterbi detector 306, which uses an algorithm to decode a trellis-encoded signal. The Viterbi detector 306 decodes the output signal y(n) and passes the decoded output bits to the ECC decoder.

Early decisions from the Viterbi detector 306 together with the interpolated output signal y(n) are also fed to a timing error detection (TED) block 308, which calculates a timing error and a sampling phase $\tau_k$ at time kT, which is passed through loop filter 310 back to the interpolator 304 in order to adjust a timing function of the interpolator 304.

It will be understood by workers skilled in the art that there are many different DD timing recovery algorithms known in the art. For example, one possible timing recovery algorithm includes joint maximum-likelihood (ML) estimation of the timing offset. Though the technique described herein can be applied to various DD timing recovery architectures, for simplicity, the following discussion assumes application of minimum mean-square-error (MMSE) timing recovery.

In general, the MMSE timing recovery is based on minimizing a mean-square-error between partial response (PR) equalized baud rate samples, denoted by $y_k(kT+\tau_k)$, and the ideal PR equalized samples $d_k$. Here, the term k denotes the time index, T is the sampling interval and $\tau_k$ represent the sampling phase at time k. The MMSE timing recovery adjusts $\tau_k$ to minimize the mean square error between $y_k(kT+\tau_k)$ and $d_k$:

$$\tau_k = \arg \min_{\tau_k} E\{(d_k - y_k(kT + \tau_k))^2\}. \quad \text{(equation 1)}$$

The least mean square error (LMS) adaptation algorithm can be used to update the sampling phase $\tau_k$ through the following equations:

$$\tau_{k+1} = \tau_k + \alpha \frac{\partial (d_k - y_k(kT + \tau_k))^2}{\partial \tau_k} \quad \text{(equation 2)}$$
$$= \tau_k + 2\alpha[d_k - y_k(kT+\tau_k)]\frac{\partial y_k(kT + \tau_k)}{\partial \tau_k}.$$

where $\alpha > 0$ is a constant that controls the convergence speed and residual error of the gradient search algorithm. In general, the timing recovery block may utilize any timing recovery scheme. In a preferred embodiment, the timing recovery block utilizes a decision-directed timing recovery scheme, such as a Mueller and Müller synchronization algorithm, which is known in the art.

During the acquisition and the tracking phase, the adaptation algorithm above can take the forms $$\tau_{k+1} = \tau_k + \alpha[d_{k-1}y_k(kT+\tau_k) - d_k y_{k-1}((k-1)T+\tau_k)] \quad \text{(equation 3)}.$$

and $$\tau_{k+1} = \tau_k + \alpha[d_k - y_k(kT+\tau_k)][d_k - d_{k-2}] \quad \text{(equation 4)}$$

respectively. It is important to note that the ideal partial response value $d_k$ is utilized in equations 3 and 4; however, the ideal partial response value $d_k$ is not available for random data, except when the transmitted data is known and after initial synchronization has been achieved. In practice, the ideal partial response value $d_k$ is either estimated from the instantaneous samples by a special channel signaling method (e.g. during the acquisition period, preamble signaling data are known after a synchronization mark has been detected) or through premature decisions from the Viterbi detector (during a tracking period).

Estimates from early decisions of Viterbi detector are generally not considered reliable. A direct consequence of unreliable ideal partial response values $d_k$ is that the sampling phase $\tau_k$ becomes very noisy, as does the sampled discrete-time signal. The reliability of $d_k$'s can be improved by directly increasing the decision delay. However, the gain achieved by increasing the reliability of $d_k$ can be discounted by the latency increase associated with the decision delay, since the sampling phase $\tau_k$ is updated much slower than desired.

When a sector fails in ECC decoding during the initial trial, the decoded data from the ECC decoder is used to adjust the timing recovery before a costly reread command is issued (assuming that the sector consists of multiple interleaved ECC codewords). By using the ECC output, it is possible to improve the timing recovery and the data detection, making it possible to recover data from the readback signal without requiring a reread operation. Since the channel Viterbi detector output is obtained without large decision delays, the $d_k$'s are more reliable than the premature decisions used for timing recovery. Additionally, the ECC decoder can further enhance the data reliability by performing error correction, even though the whole sector has failed. Since the sector consists of multiple interleaved ECC codewords, it is conceivable that some of the codewords may not have failed during decoding. In other words, some of the erroneous bits may have been corrected after the ECC decoding. The successful codewords can be utilized to improve the accuracy of a retrial.

Figure 4:
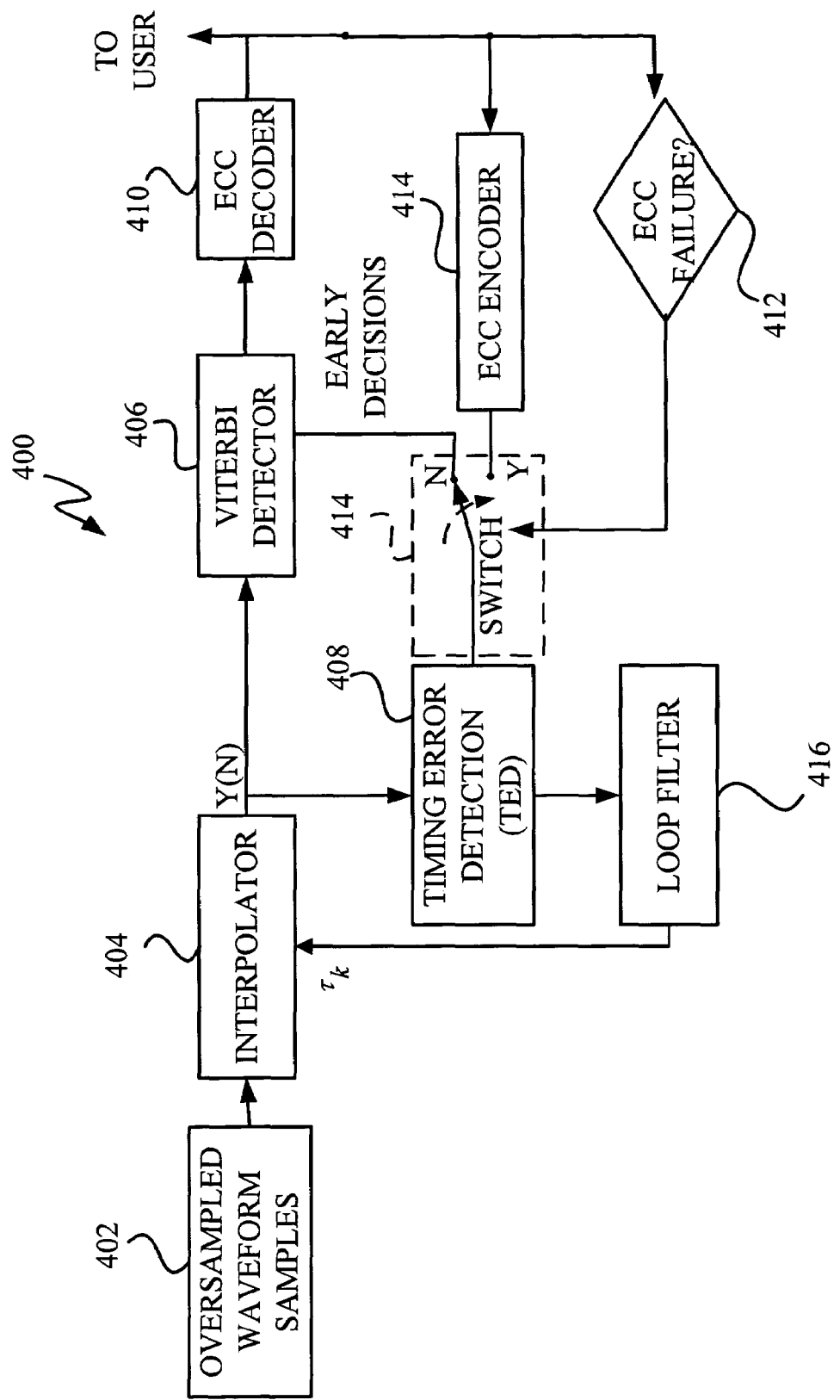
FIG. 4 is a simplified block diagram of a timing recovery architecture for retrial according to an embodiment of the present invention.

FIG. 4 illustrates an architecture 400 for exploiting the ECC output when sector failure occurs during the first trial according to an embodiment of the present invention. As shown, oversampled waveform samples 402 are passed to interpolator 404, which processes the oversampled waveform samples 402 to produce a partial response equalized output signal Y(N). The output signal Y(N) is then passed to Viterbi detector 406 and to timing error detection block 408. The Viterbi detector 406 uses an algorithm to decode the trellis-encoded output signal Y(N), and passes the decoded output signal to the ECC decoder 410. If the ECC decoder 410 succeeds, the decoded signal passed to the user. However, if ECC decoder 410 is unable to correct the errors in the signal, the ECC failure block 412 is invoked and the switch 414 is changed to a "down" position. With the switch 414 in the down position, the output of the ECC decoder 410 is fed through ECC encoder 414 and into the timing error detection block 408. The interpolated output signal Y(N) is also fed to the timing error detection (TED) block 408. The output of the timing error detection block 408 is a sampling phase $\tau_k$, which is passed through loop filter 416 and returned to the interpolator 404 to update the sampling phase.

The timing error detection block 408 uses the data bits to calculate estimates of the ideal equalized samples $d_k$, which are subsequently used to update the sampling phase according either to equation (3) or to equation (4) above. Since the estimates of $d_k$'s are more reliable than those obtained from the Viterbi early decisions, the synchronized samples Y(N) become "cleaner" than in the first trial; therefore, fewer errors are expected in the retrial process.

The waveform samples can then be retried without rereading the signal. If the resulting number of symbol errors does not exceed the error correction capability of the ECC decoder block 410, the sector read becomes successful after retrial. As a result, the data reliability of the overall system is increased without incurring the more costly overhead of a reread operation. If, after retrial, the number of symbol errors still exceeds the error correction capability of the ECC decoder block 410, the process continues with a reread operation.

Figure 5:
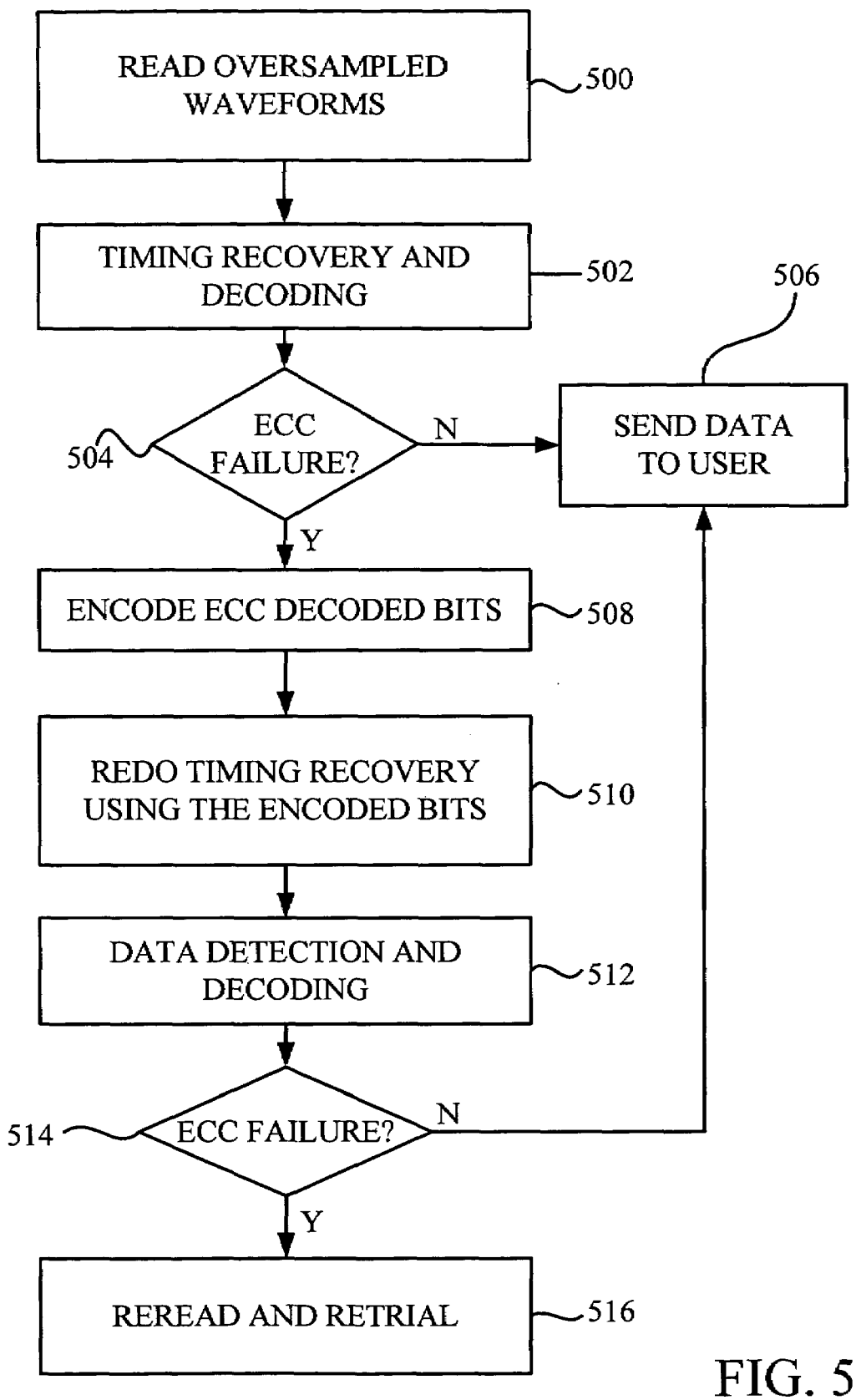
FIG. 5 is a simplified flow diagram of a retrial method with error correction code aided timing recovery without reread operations according to an embodiment of the present invention.

FIG. 5 illustrates a simplified flow diagram of a process for reading a data sector according to an embodiment of the present invention. The system reads the oversampled waveforms (block 500). The system performs timing recovery and decoding on the oversampled waveforms (block 502). The error correction code block is tested (block 504). If the error correction code block succeeds, the decoded data is sent to the user (block 506). If the error correction code block fails, the ECC decoded bits are encoded (block 508). The system again performs timing recovery using the re-encoded bits (block 510). The system again performs data detection and decoding using the updated timing information (block 512). The error correction code block is tested (block 514). If the error correction code block succeeds, the decoded data is sent to the user (block 506). If the error correction code block fails, the system performs a reread operation (block 516).

If the ECC decoding fails after the retrial procedure, the disc simply employs a reread operation by which a second copy of signals from the same sector is obtained. In conventional systems, the second readback signal copy is synchronized by the timing recovery loop configured the same way as in the first read operation, and the A/D converted signal is subsequently processed by the detection circuits and ECC decoder. The specific details of the detection circuits and ECC decoder may vary according to the specific implementation.

Figure 6:
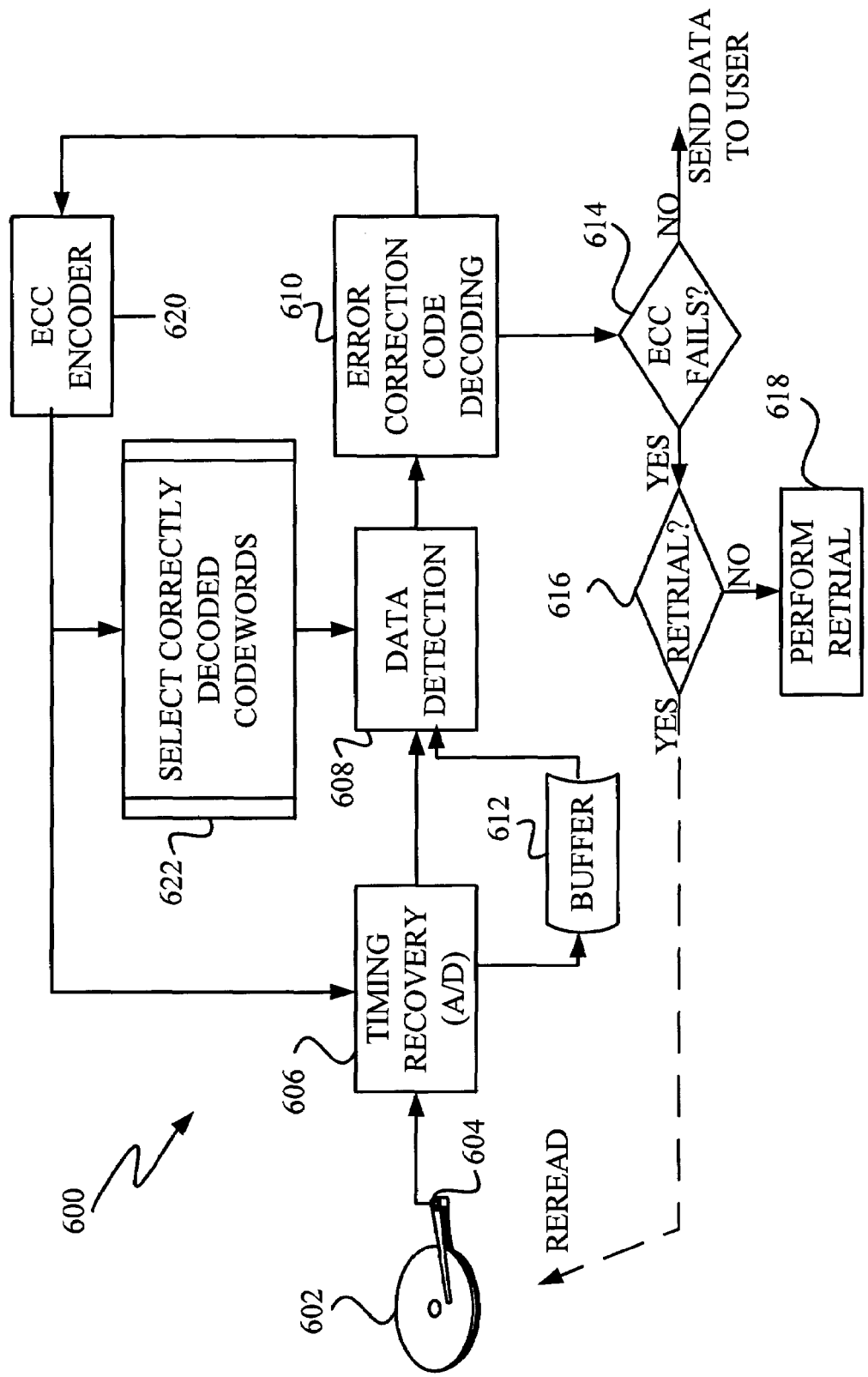
FIG. 6 is a simplified block diagram of a recording channel architecture having improved reread efficiency according to an embodiment of the present invention.

The decoding results from the first read, which failed ECC decoding, nevertheless can be exploited in the second read, both to improve synchronization and data detection. FIG. 6 illustrates a simplified block diagram of a system architecture 600 for improving the reread efficiency. The architecture 600 includes storage media 602 and a read/write mechanism 604 coupled to the storage media 602. The read/write mechanism 604 is electrically connected with a timing recovery (A/D) block 606, which passes the signal to a data detection block 608. The detected data is then passed to an error correction code decoding block 610.

During the first read operation, the A/D converted samples are stored in a buffer 612, which is used during retrial. If the sector fails during the first read (after retrial), a reread command is issued to the read/write mechanism 604 to read another copy of readback signal from the storage media 602 (or disc), and the system 600 is switched to the "reread mode". In the reread mode, the timing recovery block 606 and the detection block 608 both function differently from the normal operational mode, as detailed below.

During the reread (or second retrial) process, instead of using early decisions from the Viterbi detector, the timing loop executes timing recovery for the second copy of readback signal under the direction of the ECC decoded results obtained in the first read. For decision-directed timing recovery algorithms, this can be easily realized by calculating the desired "ideal" signal using the decoded bits from the first retrial instead of the premature bits from the Viterbi Algorithm, as discussed previously.

The synchronized samples from the storage media 602 are input to the channel detector 608 along with the samples stored in the buffer 612 from the last read operation. The detector 608 may be a traditional Viterbi detector, a soft-in-soft-out detector (such as the soft-output Viterbi algorithm (SOVA) discussed in J. Hagenauer et al., "A Viterbi Algorithm with Soft-Decision Outputs and Its Applications," in *Proc. IEEE Globecom. IEEE,* 1989, pp. 1683-1686, which is incorporated herein by reference) or the BCJR algorithm (such as the BCJR algorithm described in L. R. Bahl et al., "Optimal Decoding of Linear Codes for Minimizing Symbol Error Rate" in *IEEE Trans. Comm.,* vol. 20, pp. 284-287 (1974), which is incorporated herein by reference).

For simplicity, the following discussion describes the detection method when the Viterbi algorithm (VA) is used; however, it should be understood that other algorithms could also be employed. The VA can perform maximum-likelihood sequence detection with dual inputs, for example, the waveform samples from the first and the second read, to be denoted by $r_1$ and $r_2$, respectively. It is assumed that the conditional joint probability density function is given by $f(r_1, r_2|b)$, where b represents the bit sequence. The maximum likelihood sequence detection can be written as $$\hat{b} = \arg \max_{b} f(\underline{r_1}, \underline{r_2}, | \underline{b}).$$

In practice, the branch metric from k-th bit in the VA can be approximated by $(r_{1k}-d_k(b))^2+(r_{2k}-d_k(b))^2$ where $r_{1k}$ and $r_{2k}$ are k-th elements of $r_1$ and $r_2$, respectively, and $d_k(b)$ is the k-th desired signal corresponding to input bit sequence b.

Referring to FIG. 6, a system architecture 600 is provided for utilizing correctly decoded ECC codewords from the last retrial. The architecture 600 includes a storage media 602 with a read/write mechanism 604 coupled to the storage media 602. Data read from the storage media 602 by the read/write mechanism 604 is passed to a timing recovery block 606, which passes the data to a data detection block 608, which in turn passes the detected data to an error correction code (ECC) decoding block 610. The timing recovery block 606 also passes the data to a buffer 612. The timing recovery block 606, the data detection block 608 and the ECC decoding block 610 may be implemented as circuits and may be collectively referred to as a "decoding circuit".

The ECC decoding block 610 performs error correction on the detected data, and then tests to see if the ECC decoding failed (block 614). If the ECC decoding block 610 succeeds, the data is sent to the user or device. If the ECC fails, the architecture 600 determines whether a retrial has been performed (block 616). If a retrial has already been tried (according to the procedures described above) and has failed, a reread command is issued to the controller of the storage media 602 and the read/write mechanism 604. If a retrial has not already been tried, a retrial is performed (block 618).

In general, a retrial is an attempt to decode the read information a second time using an updated timing recovery and correctly decoded codewords from the first read attempt. Regardless of whether it is a retrial or a reread operation, the data is passed from the ECC decoding block 610 to the ECC encoder 620 and returned to the timing recovery block 606 and to a selection block 622, which selects correctly decoded codewords for use by the data detection block 608 during the decoding operation.

In the reread operation, the ECC encoded "corrected" bits are passed to the timing recovery circuit. The corrected bits and the buffer information (stored in buffer 612) are then passed to the data detection block 608, which utilizes the selected correctly decoded codewords, the synchronized waveform samples and the buffered waveform samples to detect the bits stored in the media, which are then decoded by the ECC decoding block 610. Thus, the ECC decoding block 610 performs error correction on the already improved bit sequence.

The VA in the reread mode can be made to be responsive to a third input, namely: the correctly decoded ECC codewords from the last retrial. In recording channels, a data sector often consists of multiple interleaved ECC codewords to minimize the effect of error burst. Hence, although the sector fails in ECC decoding, it may be that some codewords in the sector succeeded in the decoding process. These successful bits (if any) can be regarded as the "true" bits and they are pinned and used to guide the VA during retrial. The "pinning" process is equivalent to the decoding process of determinate state convolutional code described by O. M. Collins et al. in an article entitled "Determinate State Convolutional Codes" in *IEEE Trans. Comm.*, vol. 41, no. 12, pp. 1785-1794, which his incorporated herein by reference. Due to interleaving, these true bits are spread over the whole sector.

Figure 7:
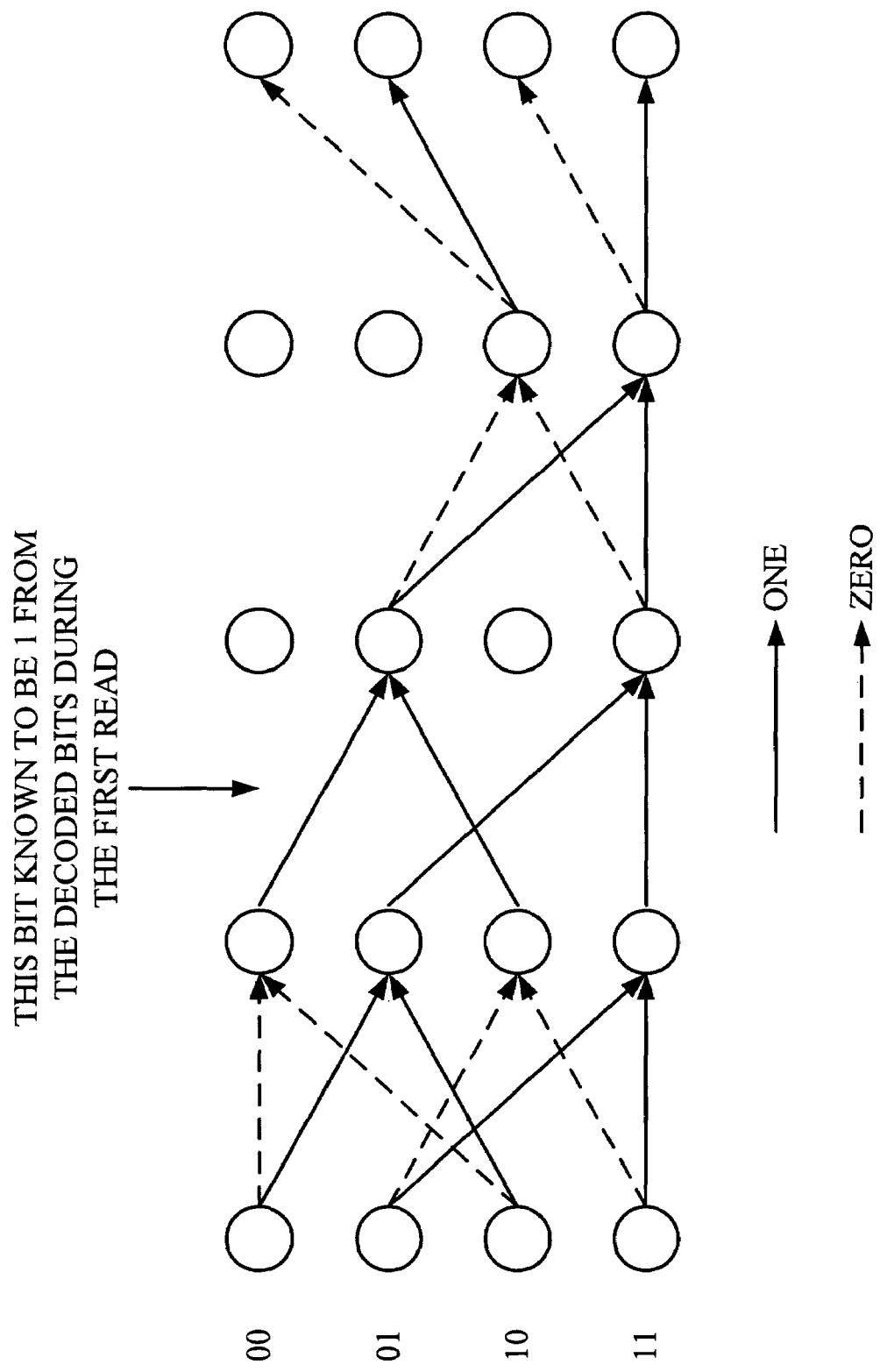
FIG. 7 is a simplified decoding trellis where one intermittent bit is known.

FIG. 7 illustrates a state trellis diagram of a decoder when one intermittent bit is fixed by the previous decoded results. In general, the trellis diagram describes a relationship between the time and the resulting code, which depends on the state of the decoder. The complexity of the trellis diagram is determined by the constraint length value of the decoder and its polynomial equation. The trellis diagram represents a decoder with a constraint length of 3, meaning the decoder has four possible states ("00", "01", "10", or "11"). By pinning or fixing bits using the ECC decoded bit sequence produced by the previous decoded results, the system is able to "prune" away or eliminate some of the possible state transitions in the decoding trellis that cause erroneous survival paths, hence providing performance gains.

In FIG. 7, each circle in a row represents a state corresponding to the bit sequence shown at the far left of the figure. Each circle in the top row represents a bit state of "00", and so on. Generally, as the bits are read, the next bit in the sequence is either a zero or a one, the most significant bit (MSB) is pushed out and the least significant bit (LSB) becomes the most significant bit resulting in a new state. For example, if the initial state is "10", in the next state, the MSB is a "1", which rolls off as the new bit is shifted into the LSB position. The LSB "10" is pushed into the MSB position. The new bit sequence (new state) will either be a "00" or a "01". In the figure, if the new bit is a "0", it is shown with a dotted line, whereas a "1" is indicated by a solid line.

If a bit is known to be a "1" from the decoded bits during the first read operation, then the next state can be only one of two possibilities: "01" or "11" depending on the previous state. Thus, the possible permutations are reduced thereby increasing the likelihood that the decoder will accurately decode the subsequent bits in the sequence.

Thus, a waveform is sampled by reading a channel, the sampled waveform is synchronized, data contained in the waveform is detected, and the data is decoded to produce a bit sequence. If the bit sequence contains too many errors, a timing recovery circuit is updated with the last decoded bit sequence. A stored copy of the waveform (which was stored in a buffer) is processed using the updated timing recovery circuit without rereading the channel. In some instances, this retrial without reread operation is sufficient to correctly recover the bit sequence. If the retrial is unsuccessful (meaning it still contains a number of errors that exceeds an error capability of the error correction circuitry), the timing recovery circuit is again updated, and then the channel is reread (resulting in a new copy of the waveform). The new copy of the waveform is synchronized using the updated timing recovery circuit and a stored waveform from the previous read operation. The data detection circuit detects the bit sequence again, and the bit sequence is again decoded. By first attempting a retrial without reread, sometimes the more time intensive reread operations are avoided without sacrificing data accuracy. If the retrial fails, by rereading and processing the reread signal using updated timing information, fewer errors are typically contained in the reread bit sequence, thereby improving system performance.

Figure 8:
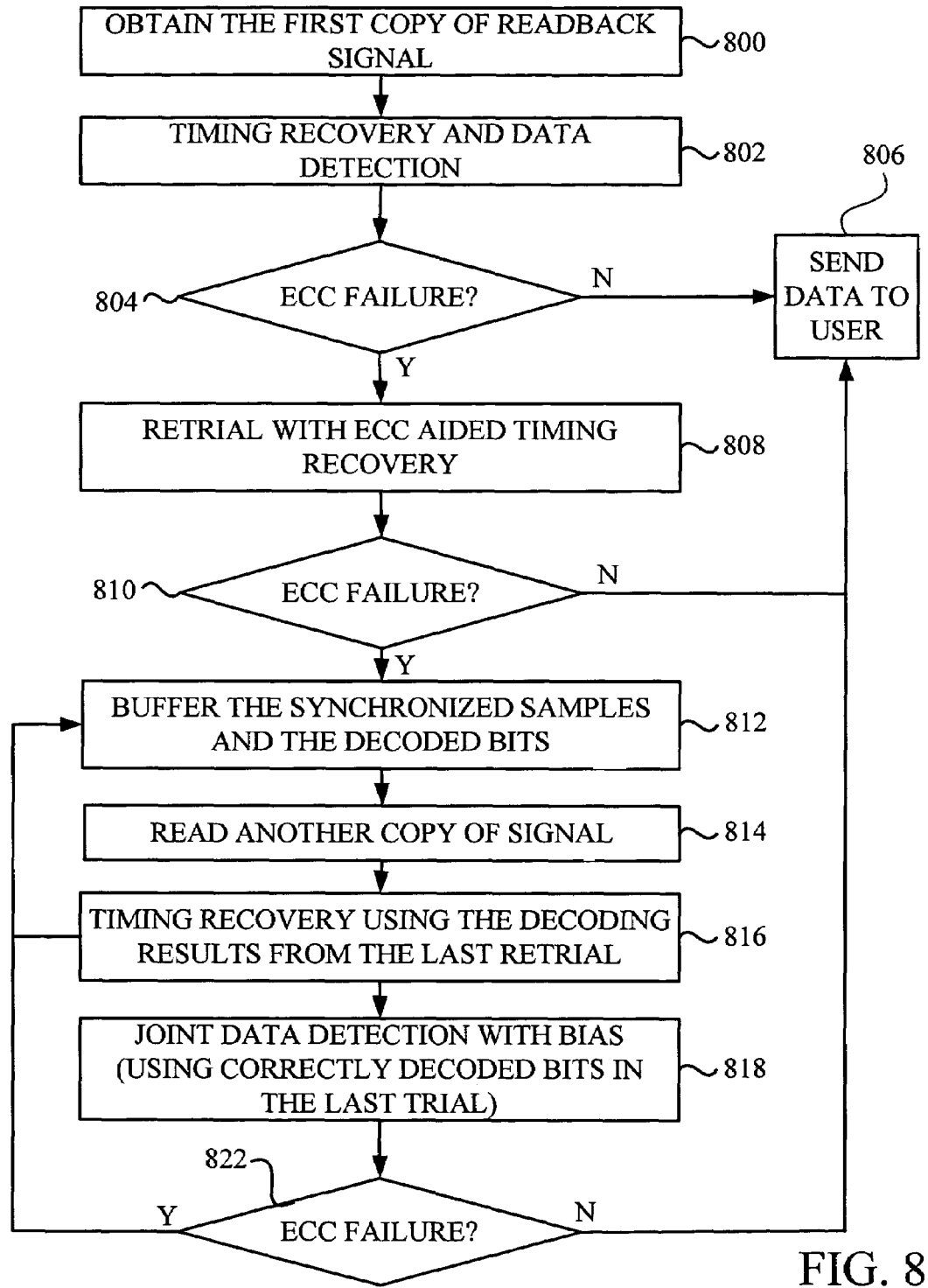
FIG. 8 is a simplified flow diagram of a method for using reread signals according to an embodiment of the present invention.

FIG. 8 illustrates the overall retrial scheme according to an embodiment of the present invention. The system starts with a single copy of an analog readback signal (block 800). The system performs timing recovery and data detection (block 802). In general, the analog signal is synchronized by the timing recovery circuit, and the baud-rate synchronized samples are input to the detector for data detection, which is followed by ECC decoding. If the ECC decoding is completed successfully, the decoded bits are sent to the user (block 806), and the disc proceeds to the next data sector.

Otherwise, the disc issues a retrial operation where the ECC decoded results are used in redoing the timing recovery (block 808). The system encodes the decoded results from the first decoding operation, passes the encoded results to the timing recovery circuit and performs a retrial with improved timing recovery. If the ECC decoding of the retrial is completed successfully, the decoded bits are sent to the user (block 806) and the disc proceeds to the next data sector.

If the retrial also fails, the synchronized samples and the decoded bits are stored in a buffer (block 812). A reread command is issued and another copy of readback signal from the same data sector is obtained (block 814). The reread signal is synchronized by using the decoded results from the last retrial (block 816) and the synchronized samples are input to the detector which is operated at the reread mode, meaning that the detector performs joint data detection and bit biasing (using correctly decoded bits from the last trial) as discussed above (block 818). If the detected bits are successfully ECC decoded (block 822), the data are sent to the user (block 806). Otherwise, the disc will issue another reread and blocks 812 through 822 are repeated until the system reaches a maximum number of reread/retrial times.

To evaluate the effectiveness of the proposed schemes, a perpendicular recording channel of normalized density 2 with 50% transition jitter noise was simulated. The term "jitter" refers to slight movement of a transmission signal in time or phase that can introduce errors and loss of synchronization. The GPR4 targets were used for equalization of both the timing recovery and the data detection, and the two independent equalizers were linear transversal filters with 21 taps. The classical DPLL second-order timing loop as described by J. W. M. Bergmans in "Digital Baseband Transmission and Recording" (Kluwer Academic Publishers, The Netherlands (1996)) was used for timing recovery.

Figure 9:
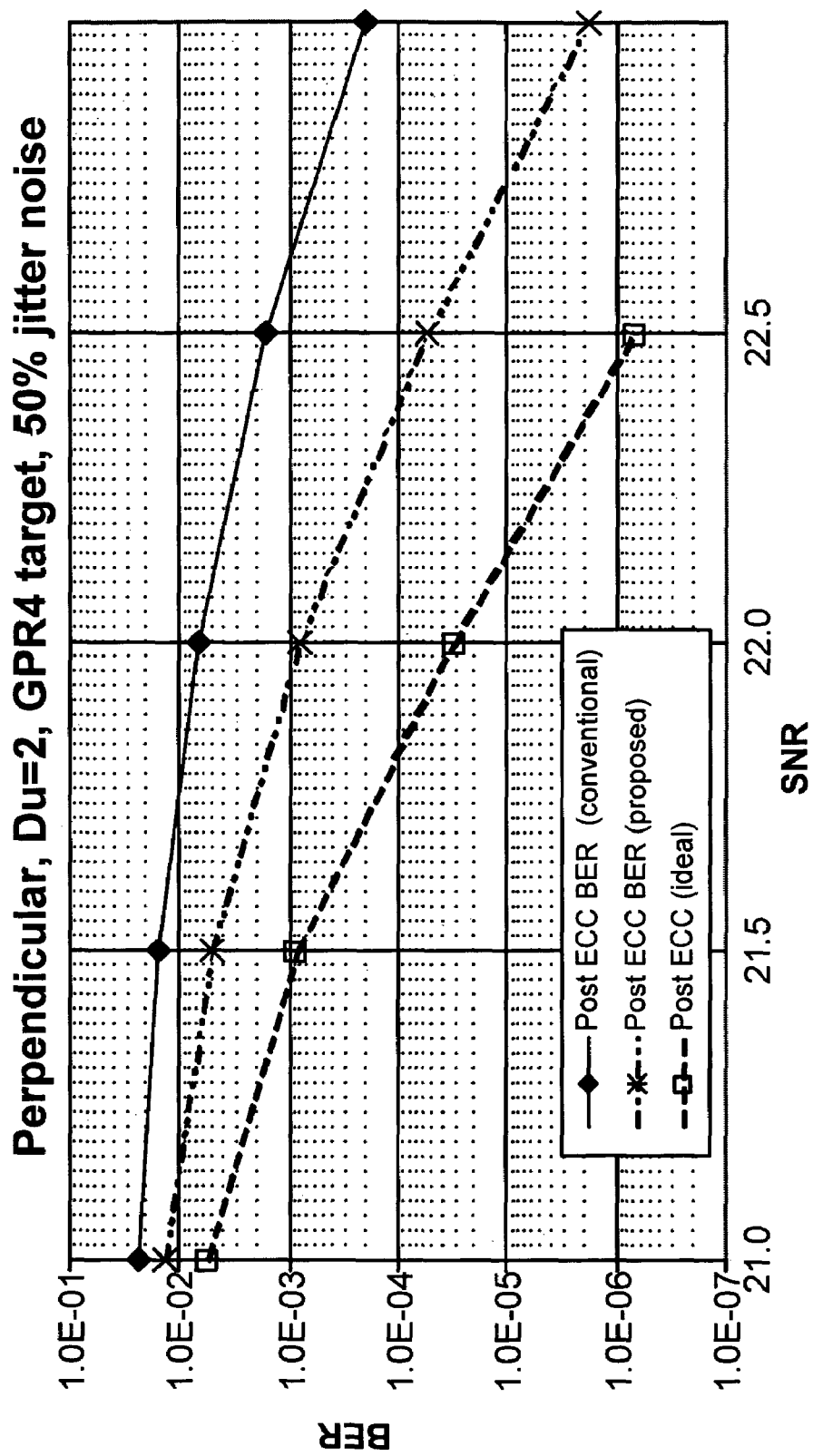
FIG. 9 is a graph of a Bit-Error-Rate (BER) versus Signal-to-Noise Ratio (SNR) after application of error-correction codes for a perpendicular recording channel at normalized density (2) with 50% medium noise comparing conventional systems to that of the present invention.

FIG. 9 illustrates the post-error-correction-coding (ECC) Bit-Error-Rate (BER) versus Signal-to-Noise Ratio (SNR) for the scheme described above with respect to FIGS. 2-5. The post-ECC BER is illustrated when early Viterbi decisions are used for timing recovery (the conventional algorithm). In simulations, the ECC output was used for timing recovery regardless of whether there was a sector failure. It is important to note that this represents a worst-case scenario. If one uses the ECC output to redo the timing recovery only when there is a ECC failure during the first trial, the post-ECC BER during retrial should be better than the results shown here. In particular, such a scheme eliminates the case where the sector succeeds in the first trial but fails during retrial, although such a probability is very small. For illustration purposes, the results of gene-aided timing recovery (i.e., assuming the user bits are perfectly known during timing recovery) are also shown. The SNR is defined as $$SNR = \frac{E_i}{N_0 + M_0},$$

where $E_i$ is the energy of the impulse response of the channel, $N_0$ is the electronic noise power spectrum density height (single-sided), and $M_0$ is the average medium noise energy associated with a single transition.

Though there is gap between the proposed method and the gene-aided timing recovery (where the user data are assumed to be perfectly known), the proposed method enjoys a significant BER improvement as compared to conventional timing recovery. In other words, when only a single read is allowed, the proposed scheme significantly improves the data reliability, which entails that for the same BER requirements, fewer rereads are required for the proposed scheme. Since each reread operation introduces additional latencies, a reduction in the number of rereads improves the decoding system.

Although the sector failure rate (SFR) is the ultimate performance metric, it is difficult to obtain a reliable estimate of SFR in the order of $10^{-10}$ to $10^{-15}$. Consequently, Table 1 shows a counted SFR.

TABLE 1

Counted Sector Failures for the ECC Aided Timing Recovery Retrial

| | SNR | | | |
| --- | --- | --- | --- | --- |
| | 21.0 dB | 21.5 dB | 22.0 dB | 22.5 dB |
| Total Sectors | 147 | 593 | 8595 | 87300 |
| Erroneous Sectors (conventional) | 131 | 197 | 680 | 2172 |
| Erroneous Sectors (ECC Aided Timing Recovery) | 100 | 100 | 100 | 100 |

For the results shown, simulations were run until the counted sector failures reached the number of 100 sectors for the scheme of the present invention. From Table 1, it should be apparent that the method of the present invention provides significant performance gains over conventional systems, particularly at higher SNRs, where the ECC is more effective. For example, at SNR 22.5 dB, there are 100 sector failures out of 87300 sectors (4096 user data bits/sector) for the method of the present invention as compared to 2172 sector failures for the conventional method.

In the simulations, consideration was not given to the effects of run-length-limited (RLL) modulation code. RLL code generally facilitates timing recovery; however, it can also cause error propagation in the final decoding results. The method of the present invention would perform better on RLL code with better suppression of error propagation or on an architecture where the RLL decoding is performed after error-correction decoding.

Figure 10:
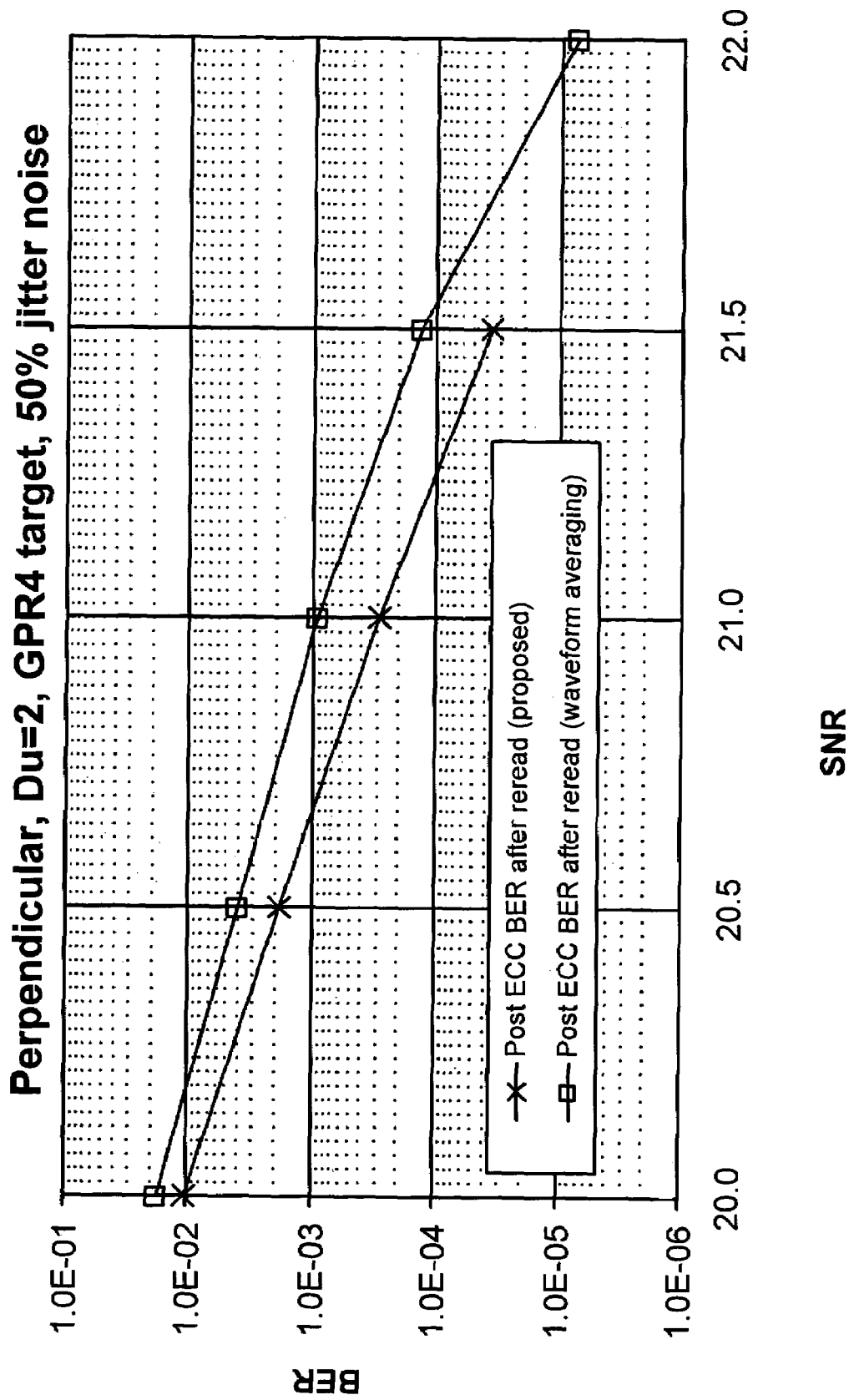
FIG. 10 is a graph of the BER vs. SNR after reread for a perpendicular recording channel at normalized density (2) with 50% medium noise comparing a conventional waveform averaging system to that of the present invention.

The performance of the enhanced reread scheme is evaluated by observing the post-ECC BER and counted SFR given that one reread signal is available. In FIG. 10, post-ECC BER results for a retrial scheme according to an embodiment of the present invention is shown after a reread. A flow diagram of the simulated retrial scheme is shown in FIG. 8. The BER shown is the post-ECC BER given that each sector is allowed to be reread once if the sector fails for the first copy of readback signal. For comparison purposes, a post-ECC BER is shown for a reread scheme utilizing a waveform averaging reread. The waveform averaging reread scheme is one of the most efficient reread schemes in the prior art for exploiting reread signals. The simulation demonstrates that the scheme implementing the method of FIG. 8 provides consistent gains over the waveform averaging method.

Such performance gains are particularly obvious by observing the counted sector failure rate. In Table 2, counted sector failures after the reread for both the method of FIG. 8 and the waveform averaging scheme are shown.

TABLE 2

Counted Sector Failures for the Enhanced Reread Scheme

| | SNR | | | |
| --- | --- | --- | --- | --- |
| | 20.0 dB | 20.5 dB | 21.0 dB | 21.5 dB |
| Total Sectors | 127 | 397 | 5189 | 321160 |
| Erroneous Sectors (waveform averaging) | 126 | 198 | 511 | 2295 |
| Erroneous Sectors (Enhanced reread) | 100 | 100 | 100 | 100 |

The method of the present invention outperforms the waveform averaging by a wide margin. For instance, at SNR 21.5 dB, the waveform averaging results in 2295 erroneous sectors (unrecoverable sectors after reread) out of 321,160 sectors, as compared to only 100 errors for the enhanced reread method of an embodiment of the present invention.

Figure 11:
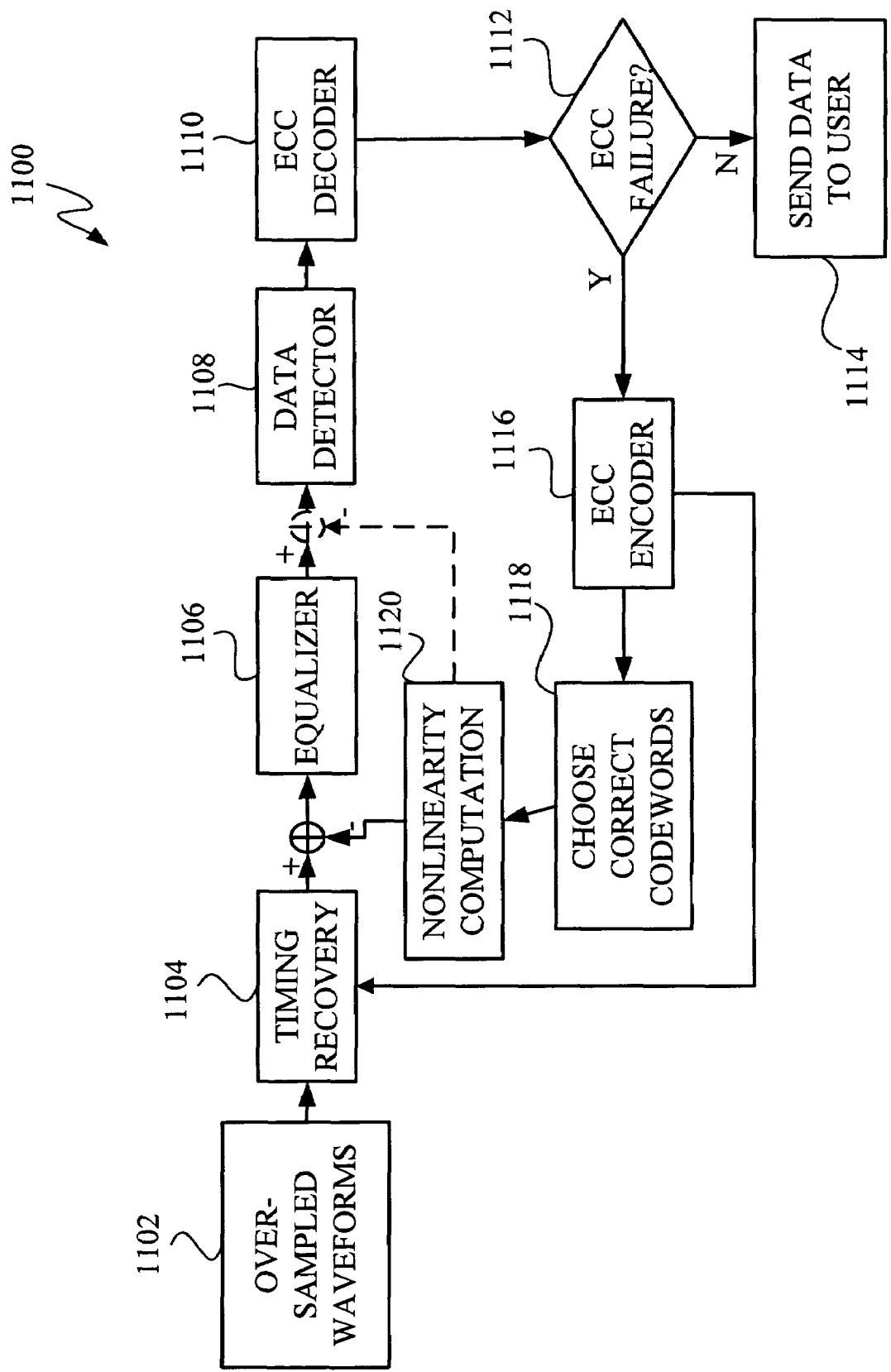
FIG. 11 is a simplified block diagram of a recording channel architecture for error-correction code aided nonlinearity cancellation according to an embodiment of the present invention.

In yet another embodiment, the method of the present invention can be enhanced by adding a nonlinearity cancellation or mitigation apparatus using correctly decoded ECC codewords as feedback to the front end in order to further improve the efficiency of the retrial/reread operation. FIG. 11 illustrates a simplified block diagram of an architecture 1100 for ECC aided nonlinearity cancellation.

The disc reads a data sector and stores the oversampled waveforms 1102 in a buffer (not shown). In the first trial, the channel performs normal operations. The oversampled waveforms 1102 are synchronized by the timing recovery block 1104. The oversampled and synchronized waveforms are equalized by equalizer 1106 and detected by the sequence (data) detector 1108. The detected sequence is passed to the ECC decoder 1110. If the ECC decoding is successful (block 1112), the data is sent to the end user and the disc proceeds to the next sector (block 1114). Otherwise, the disc initiates a retrial operation, where the ECC decoded bits are re-encoded by encoder 1116 and sent back to the channel (to the timing recovery block 1104). Additionally, the encoded codewords are processed to select correct codewords (block 1118) and passed to a nonlinearity computation block 1120.

Specifically, during the retrial, the data channel uses the re-encoded bits to correct the timing recovery, as previously described. Any of the correctly decoded bits (which have been re-encoded by the encoder 1116) can be used to compute the nonlinearity (in the nonlinearity computation block 1120). Subsequently, the computed nonlinearity is subtracted from the signal. The subtraction of the nonlinearity can be executed before the equalizer 1106 or after the equalization, depending on whether the computed nonlinearity is tuned for equalized signals or not. If the nonlinearity computation is designed for non-equalized signals, the subtraction occurs before the equalizer. Otherwise, subtraction should be executed after equalization (prior to sequence detection as shown by the dotted line.

Generally, the nonlinearity computation block 1120 can be an algorithm based on any known nonlinearity model. For example, one such model, the Volterra model, can be used to calculate the nonlinearity introduced by known bits.

It has been well demonstrated in the literature that nonlinearity can cause significant system performance loss. The embodiment of FIG. 11 exploits the ECC decoded results to cancel or mitigate the nonlinearity effects from the signal, and thus improves the system performance during retrial operations.

It should be noted that present invention is not limited to simple addition or subtraction algorithms involving the computed nonlinearity. If the equalizer and/or the detector in the channel are designed for signals with nonlinearity, the corrected bits can be utilized by the equalizer/detector accordingly with respect to their nonlinearity cancellation algorithms applied.

Generally, the present invention makes uses of the first results of a decoding operation to improve the system performance of recording channels during retrial and reread. Due to the system overhead associated with the reread operation, it is generally desirable to minimize the number of reread operations while meeting the targeted BER or SFR. Thus, a method according to an embodiment of the present invention exploits the ECC decoded results to revise the timing recovery. In many cases, the previously erroneous sector becomes successfully decoded due to improved synchronization in the retrial operation without necessitating a reread operation.

Additionally, the present invention also acts on the recognition that the same technique can be utilized to improve the reread results if a reread becomes necessary after a retrial operation. The technique can be referred to as an "enhanced reread" technique. Generally, if the sector fails even after the aforementioned retrial operation, a reread command is issued and a second copy of signal is obtained from the same sector of the storage media. The reread signal is then synchronized by using the decoded results from the last retrial, and subsequently is jointly decoded with the waveform samples obtained from the last retrial using a possibly biased detector. Simulations show that the proposed schemes offer consistent gains over existing methods, in terms of both BER and SFR.

While it is anticipated that the two schemes will be employed together to improve overall system performance, it should be understood the improved timing recovery technique of the present invention can be utilized for retrial operations only, for reread operations only, or together. Each of the possible arrangements should result in SFR gains over conventional systems. Our simulations show that each of them can provide consistent performance improvement independently without incurring significant complexity increase.

Figure 12:
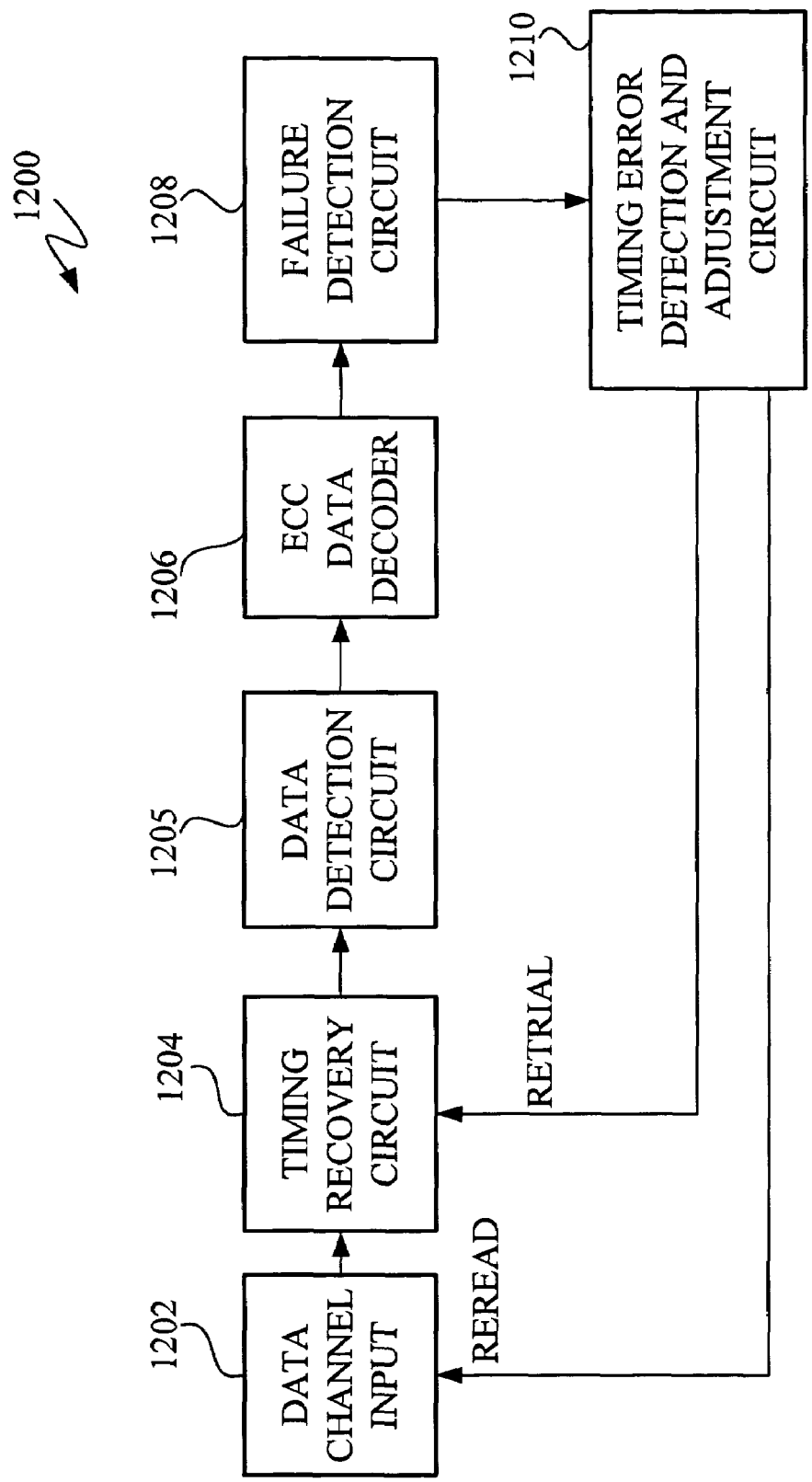
FIG. 12 is a simplified block diagram of a system adapted to receive data according to an embodiment of the present invention.

FIG. 12 illustrates a simplified block diagram of a decoder circuit 1200 according to an embodiment of the present invention. The decoder circuit 1200 includes a data channel input 1202 for receiving a signal from a data channel. A timing recovery circuit 1204 synchronizes the signal received by the data channel input 1202. The synchronized signal is then converted to a digital bit sequence by the data detection circuit 1205. The ECC decoder 1206 decodes the detected bits. A failure detection circuit 1208 determines whether the number of errors in the detected bits exceeded an error correction capability of the ECC decoder 1206. Generally, the error correction capability is the maximum number of errors in a data block that the ECC decoder 1206 can correct.

If the failure detection circuit 1208 determines that the error correction capability is exceeded, a timing error detection and adjustment circuit 1210 calculates the timing and phase errors using the ECC corrected bit sequence (after ECC decoding and re-encoding), and passes the error adjustment to the timing recovery circuit 1204. The system 1200 then attempts to re-decode the data (a retrial operation), without rereading the data from the data channel input 1202. The data is then processed in the same way as with the first try; however, the synchronization of the timing recovery circuit 1204 is updated with the error adjustment information from the first trial. If the retrial operation fails, the system 1200 then attempts a reread of the data channel input 1202, and the process is repeated.

In one embodiment, when a reread operation is required, a resend request is sent over a communication channel to prompt a sending device to resend the data, which may be packetized for transmission over a network, such as the Internet. Alternatively, when a reread operation is required, a controller of a storage system may be commanded to reread the same sector of the storage media. In either case, the results of the resend or reread operation are received at the data channel input 1202 and the process is repeated.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the decoding system while maintaining substantially the same functionality without departing from the scope and spirit of the present invention. In addition, although the preferred embodiment described herein is directed to a retrial and reread method and system for improving data detection and decoding in storage devices, it will be appreciated by those skilled in the art that the teachings of the present invention can be applied to any system involving data detection and decoding, without departing from the scope and spirit of the present invention.

What is claimed is:

1. A method of reading a data block from a data channel, the method comprising:
reading a data block from the data channel;
decoding the data block with a decoding circuit to obtain a decoded data block during a first trial, wherein the decoding circuit utilizes a timing recovery algorithm to perform timing recovery on the data block to obtain the decoded data block; and
in response to the decoded data block exceeding an error correction capability of the decoding circuit, performing a re-decoding operation during a second trial using the decoded data block from the first trial, wherein performing the re-decoding operation comprises:
encoding at least a portion of the decoded data block from the first trial to obtain a re-encoded data block;
adjusting the timing recovery algorithm based on the re-encoded data block; and
re-decoding the data block using the adjusted timing recovery algorithm to obtain a re-decoded data block.

2. The method of claim 1 further comprising:
determining that the re-decoded data block exceeded an error correction capability of the decoding circuit and, in response, rereading the data block from the data channel using the adjusted timing recovery algorithm that is adjusted based on the re-decoded data block.

3. The method of claim 1 wherein the decoding circuit comprises:
timing recovery circuitry for synchronizing sampled waveforms;
data detection circuitry for detecting data within the sampled waveforms; and
error correction decoding circuitry for correcting errors in the detected data.

4. The method of claim 1 wherein the data channel is a storage medium.

5. The method of claim 4 wherein decoding the data block comprises:
sampling waveforms on the storage medium to read the data block;
synchronizing the sampled waveforms according to the timing recovery algorithm;
detecting the data block in a detector; and
decoding the detected data block with an ECC decoder.

6. The method of claim 5 wherein the detector comprises a sequence detector.

7. The method of claim 6 wherein the sequence detector is selected from a group consisting of a Viterbi detector, a soft-output Viterbi Algorithm and a BCJR algorithm.

8. The method of claim 1 wherein reading the data block comprises sampling a waveform from the data channel, and wherein the step of decoding comprises decoding the sampled waveform into a decoded bit sequence, the method further comprising:
storing the sampled waveform in a buffer.

9. The method of claim 8, wherein encoding comprises re-encoding the decoded bit sequence from the decoding circuit with an ECC encoder, and wherein the adjusting step comprises performing timing recovery using the re-encoded bit sequence and the stored waveform to obtain re-synchronized signal samples, and wherein the re-decoding step comprises detecting the data block using the re-synchronized signal samples with a sequence detector and decoding the detected data block using the decoding circuit without rereading the data block from the data channel.

10. The method of claim 9 wherein performing timing recovery comprises:
re-sampling the stored waveform using a decision-directed timing recovery scheme.

11. The method of claim 10 wherein the decision-directed timing recovery scheme comprises a Mueller and Müller synchronization algorithm or a minimum mean square error timing recovery algorithm.

12. The method of claim 10 wherein the decision-directed timing recovery scheme is operated under decisions from the re-encoded data sequence from the ECC encoder.

13. The method of claim 2 wherein the data channel is a storage medium, and wherein encoding comprises encoding the decoded data block with an ECC encoder, and wherein rereading comprises:
rereading the data block from a sector of the storage medium;
synchronizing the reread signal using a decision directed timing recovery algorithm where the decisions are a re-encoded bit sequence from the encoding step;
detecting the synchronized signal samples with a detector; and
decoding the detected data block with an ECC decoder.

14. The method of claim 13 wherein the detector produces an output to the decoder based on the reread signal samples, the signal samples from a first read operation, and correctly decoded codewords from the first read operation.

15. A method of decoding a data block after a data block failure in a first trial, the method comprising:
sampling readback waveforms representative of a data block from a data channel;
synchronizing the sampled readback waveforms according to a timing recovery algorithm;
detecting an encoded first bit sequence within the synchronized readback waveforms using a detector;
decoding the detected first bit sequence with an ECC decoder during a first trial; and
in response to the decoded first bit sequence exceeding an error correction capability of the ECC decoder, performing a decoding operation during a second trial using the decoded first bit sequence from the first trial, wherein performing the decoding operation during the second trial comprises:
re-encoding at least a portion of the data bits from the first bit sequence that were decoded during the first trial;
re-synchronizing the sampled readback waveforms representative of the data block using a decision-directed timing recovery algorithm directed with the re-encoded data bits from the first trial;
detecting a second bit sequence within the re-synchronized waveforms using the detector; and
decoding the detected second bit sequence with the ECC decoder in a second trial.

16. The method of claim 15 and further comprising:
storing the readback waveforms in a buffer; and
storing the resynchronized waveform samples in the buffer.

17. The method of claim 16 wherein the step of re-synchronizing comprises:
calculating estimates of ideal partial response equalized samples $d_k$ using the re-encoded data bits; and
updating a sampling phase with the calculated estimates and the stored readback waveforms.

18. The method of claim 15 wherein if decoding the detected second bit sequence produces a number of symbol errors which exceeds an error correction capability of the ECC decoder, the method comprises:
performing a reread operation.

19. The method of claim 18 wherein performing a reread operation comprises:
reading another copy of the readback waveform representative of the same data block from the channel;
synchronizing the reread waveform with a decision-directed timing recovery algorithm using decisions from the re-encoded data bits from the first trial;
detecting a bit sequence within the synchronized reread waveform with a detector which performs joint detection on the synchronized reread waveform and a stored synchronized waveform from the first trial, under the direction of previously correctly decoded codewords;
decoding the detected bit sequence using an ECC decoder; and
sending the decoded bit sequence to a user if the ECC decoding step is successful;
wherein the method is repeated if a number of symbol errors exceeds an error correction capability of the ECC decoder.

20. A decoder for decoding data from a data channel, the decoder comprising:
a data channel input for receiving signals from the data channel; and a decoder circuit coupled to the data channel input and configured to perform a first decoding operation on a portion of data received from the data channel input using a timing recovery algorithm to decode the portion of data; and wherein the decoder circuit selectively performs a second decoding operation using decoded data from the first decoding operation if a number of errors of a data block in the first decoding operation exceeds an error correction capability of the decoder circuit, wherein the decoder circuit performs the second decoding operation by adjusting the timing recovery algorithm using re-encoded data from the first decoding operation and performing the second decoding operation on the portion of data using the adjusted timing recovery algorithm without rereading data from the data channel, wherein the decoder circuit selects a number of correctly decoded codewords from the first decoding operation and uses the adjusted timing recovery algorithm and the correctly decoded codewords to perform the second decoding operation.

21. The decoder of claim 20 wherein the decoder is configured to reread the data channel if the second decoding operation fails.

22. The decoder of claim 20 wherein the reread data is decoded by the decoder circuit.

23. The decoder of claim 20 wherein the decoder circuit comprises:
a timing recovery circuit coupled to the data channel input and configured to synchronize signals from the data channel input.

24. The decoder of claim 20 and further comprising:
an error correction code decoder configured to decode data and to correct errors contained within the data; and
a failure detection circuit configured to detect when a number of errors contained within the data exceeds an error correction capability of the error correction code decoder.

25. The system of claim 24 and further comprising:
a timing recovery circuit responsive to decisions from a previously decoded and re-encoded data sequence.

26. The decoder of claim 20 wherein the decoder is configured to reread the data, the decoder further comprising:
a data sequence detector configured to perform joint detection of two copies of synchronized waveform samples from the same data block.

27. The system of claim 20 wherein the data channel comprises:
a storage medium or any other communication channel wherein data transmission is block based.

* * * * *

UNITED STATES PATENT AND TRADEMARK OFFICE
CERTIFICATE OF CORRECTION

PATENT NO.      : 7,665,007 B2                                                           Page 1 of 1
APPLICATION NO. : 10/881398
DATED           : February 16, 2010
INVENTOR(S)     : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Seventh Day of December, 2010

David J. Kappos
*Director of the United States Patent and Trademark Office*